US010488070B1

(12) United States Patent
Wolfson

(10) Patent No.: US 10,488,070 B1
(45) Date of Patent: Nov. 26, 2019

(54) SYSTEMS AND METHODS FOR CONTROLLING AN INTAKE FAN

(71) Applicant: Tuckernuck Technology, L.L.C., Duxbury, MA (US)

(72) Inventor: Jason Wolfson, Marshfield, MA (US)

(73) Assignee: Tuckernuck Technology, L.L.C., Duxbury, MA (US)

( * ) Notice: Subject to any disclaimer, the term of this patent is extended or adjusted under 35 U.S.C. 154(b) by 108 days.

(21) Appl. No.: 15/596,104

(22) Filed: May 16, 2017

Related U.S. Application Data

(60) Provisional application No. 62/345,400, filed on Jun. 3, 2016.

(51) Int. Cl.
| | |
|---|---|
| *F24F 11/00* | (2018.01) |
| *F24F 11/77* | (2018.01) |
| *F24F 11/30* | (2018.01) |
| *F24F 11/62* | (2018.01) |
| *F24F 11/56* | (2018.01) |

(52) U.S. Cl.
CPC .......... *F24F 11/77* (2018.01); *F24F 11/0001* (2013.01); *F24F 11/30* (2018.01); *F24F 11/62* (2018.01); *F24F 11/56* (2018.01); *F24F 2011/0002* (2013.01)

(58) Field of Classification Search
CPC ............................. F24F 11/00; F24F 11/0001
USPC ......................................... 454/229, 238, 239
See application file for complete search history.

(56) References Cited

U.S. PATENT DOCUMENTS

| | | | | |
|---|---|---|---|---|
| 4,045,878 A | * | 9/1977 | Steffen | B65D 88/742 |
| | | | | 34/491 |
| 4,245,779 A | * | 1/1981 | Ardiente | F23N 3/06 |
| | | | | 126/285 B |
| 2012/0252345 A1 | * | 10/2012 | Wolfson | F24F 7/08 |
| | | | | 454/239 |
| 2014/0094105 A1 | * | 4/2014 | Lundh | G05D 7/0676 |
| | | | | 454/168 |
| 2015/0276250 A1 | * | 10/2015 | Lintern | C09K 8/528 |
| | | | | 454/239 |

OTHER PUBLICATIONS

'GarageVent™ / AirCycler' [online]; AirCycler Simple Ventilation Solutions, 2018, Retrieved on Apr. 17, 2018; retrieved from the internet: URL https://www.aircycler.com/pages/garageven ; 2 pages.

(Continued)

*Primary Examiner* — Steven B McAllister
*Assistant Examiner* — Ko-Wei Lin
(74) *Attorney, Agent, or Firm* — Fish & Richardson P.C.

(57) ABSTRACT

A method of ventilation includes receiving at least one signal indicative of an operation of one or more exhaust fans causing air to be exhausted out of a building. The method further includes determining, by one or more processing devices, a total expulsion rate of air being exhausted out of the building by the one or more exhaust fans based on the signal, and determining, by the one or more processing devices, a target fan speed of one or more intake fans configured to draw external air into the building. The target fan speed of the one or more intake fans is determined to achieve an inflow rate that is substantially equal to the total expulsion rate. The method also includes controlling the one or more intake fans using one or more control signals in accordance with the target fan speed.

25 Claims, 5 Drawing Sheets

(56) References Cited

OTHER PUBLICATIONS

'EZ Breathe.com Ventilation Systems [online]; "Photo Gallery / EZ Breath"; 2018; Retrieved on Apr. 17, 2018; retrieved from the internet: URL http://ezbreathe.com/gallery/ ; 9 pages.

* cited by examiner

SYSTEMS AND METHODS FOR CONTROLLING AN INTAKE FAN

PRIORITY CLAIM

This application claims priority to U.S. Provisional Application No. 62/345,400, filed on Jun. 3, 2016, the entire content of which is incorporated herein by reference.

TECHNICAL FIELD

This specification relates to ventilation systems deployed in buildings.

BACKGROUND

Buildings can be constructed to be air tight to reduce the amount of conditioned (e.g., heated or cooled) air escaping the building or to reduce the amount of outside air infiltrating into the building. Mechanical ventilation can be added to bring in fresh air to improve air quality within the building. This fresh air can be brought into the building using a central fan and an air duct system associated with a central heating system and/or an air conditioning system to inject an amount of fresh air from an outside known source and distribute it throughout the home. A controller such as that included in the AirCycler™ ventilation system available from Lipidex Corporation of Marshfield, Mass. can facilitate this process. The AirCycler™ ventilation system can monitor a thermostat to determine a duration of time during which the thermostat causes the central fan to bring in fresh air (e.g., as part of heating or cooling). If the amount of fresh air brought in that duration of time is less than a target amount, the AirCycler™ ventilation system can turn on the central fan for an additional time period to bring in an additional amount of fresh air to meet the target amount.

SUMMARY

In some aspects, a method of ventilation includes receiving at least one signal indicative of an operation of one or more exhaust fans causing air to be exhausted out of a building. The method further includes determining, by one or more processing devices, a total expulsion rate of air being exhausted out of the building by the one or more exhaust fans based on the signal, and determining, by the one or more processing devices, a target fan speed of one or more intake fans configured to draw external air into the building. The target fan speed of the one or more intake fans is determined to achieve an inflow rate that is substantially equal to the total expulsion rate. The method also includes controlling the one or more intake fans using one or more control signals in accordance with the target fan speed.

In further aspects, a system for ventilation includes a controller including memory and one or more processors operable to execute instructions stored on a computer readable storage device to perform operations. The operations include receiving at least one signal indicative of an operation of one or more exhaust fans causing air to be exhausted out of a building. The operations further include determining, based on the at least one signal, a total expulsion rate of air being exhausted out of the building by the one or more exhaust fans, and determining a target fan speed of one or more intake fans configured to draw external air into the building. The target fan speed of the one or more intake fans is determined to achieve an inflow rate that is substantially equal to the total expulsion rate. The operations also include controlling the one or more intake fans using one or more control signals in accordance with the target fan speed.

In certain aspects, a ventilation system includes one or more an intake fans configured to supply external air into a building and a controller operatively coupled to the one or more intake fans. The controller is configured to receive at least one signal indicative of an operation of one or more exhaust fans causing air to be exhausted out of a building. The controller is further configured to determine, based on the at least one signal, a total expulsion rate of air being exhausted out of the building by the one or more exhaust fans, and to determine a target fan speed of one or more intake fans configured to draw external air into the building. The target fan speed is determined to achieve an inflow rate that is substantially equal to the total expulsion rate. The controller is also configured to control the one or more intake fans using a control signal in accordance with the target fan speed.

Implementations can include one or more of the features described below and herein elsewhere.

In some examples, the one or more exhaust fans can include multiple exhaust fans.

In some examples, receiving the signal indicative of the operation of the one or more exhaust fans can include receiving flow rate data from a sensor coupled to each of the one or more exhaust fans. The signal can be indicative of flow rate data.

In some examples, the controller can be configured to receive flow rate data from a sensor coupled to each of the one or more exhaust fans. The signal can be indicative of flow rate data.

In some examples, determining the total expulsion rate of air can include determining a flow rate of each of the one or more exhaust fans based on a fan speed of each of the one or more exhaust fans.

In some examples, the controller can be configured to determine a flow rate of each of the one or more exhaust fans based on a fan speed of each of the one or more exhaust fans.

In some examples, controlling the one or more intake fans can include operating an intake fan of a forced air furnace.

In some examples, the controller can be configured to operate an intake fan of a forced air furnace.

In some examples, the method or the operations can include detecting deactivation of each of the one or more exhaust fans such that the total expulsion rate of air is substantially zero. The method or the operations can include deactivating the one or more intake fans in response to detecting the deactivation of each of the one or more exhaust fans. The method or the operations can include closing a motorized damper in response to detecting the deactivation of each of the one or more exhaust fans.

In some examples, the controller can be configured to detect deactivation of each of the one or more exhaust fans such that the total expulsion rate of air is substantially zero. The controller can be configured to deactivate the one or more intake fans in response to detecting the deactivation of each of the one or more exhaust fans. The controller can be configured to close a motorized damper in response to detecting the deactivation of each of the one or more exhaust fans.

In some examples, the method or the operations can include operating at least one of the one or more exhaust fans to control the total expulsion rate of air being exhausted out of the building.

In some examples, the controller can be configured to operate at least one of the one or more exhaust fans to control the total expulsion rate of air being exhausted out of the building.

In some examples, the method or the operations can include selectively directing the external air drawn by the one or more intake fans toward a location of the one or more exhaust fans in the building.

In some examples, the controller can be configured to selectively direct the external air drawn by the one or more intake fans toward a location of the one or more exhaust fans in the building.

In some examples, the ventilation system can further include the one or more exhaust fans.

In some examples, the ventilation system can further include one or more sensors. Each of the sensors can be operatively coupled with the one or more exhaust fans. The one or more sensors can be configured to generate the at least one signal indicative of an operation of one or more exhaust fans.

In some examples, the one or more exhaust fans can include at least one bathroom exhaust fan and at least one kitchen-hood fan.

In some examples, the ventilation system can include a motorized damper configured to be opened and closed in accordance with control signals generated by the controller.

The systems and methods described herein may have advantages described below and herein elsewhere. By monitoring an amount of air expelled from the building by the one or more exhaust fans, the controller may more accurately determine an amount of air to be drawn into the building to replace the expelled air. The controller may therefore be configured to operate the intake fan only when ventilation is necessary, thereby potentially reducing the likelihood of unnecessary activation of the intake fan. This in turn may reduce over-ventilation or under-ventilation, potentially reducing energy costs and pressure mismatches. Furthermore, by accounting for an amount of air expelled from the building and having the intake fan positioned to draw in a correspondingly calculated amount of fresh air from a known source, the technology described herein may be used to improve indoor air quality, for example, by potentially reducing low quality air leaking in from undesirable sources (e.g., an attached garage). This may decrease infiltration of pollutants and/or other undesirable substances (e.g., carbon monoxide, pollen etc.) that can reduce the air quality of indoor air.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

The present disclosure describes systems, methods, and devices for controlling an inflow of air into a building from a desirable air source. In particular, these systems, methods, and devices can be used to operate a powered air supply fan, e.g., an intake fan, to control the inflow of air such that the inflow is drawn from a known fresh air source (e.g., exterior of the building) as opposed to less desirable air sources (e.g., leakage from an attached garage). For example, by computing an amount of air expelled from the building (e.g., via exhaust fans, kitchen hoods, or other expulsion pathways), and operating one or more supply fans at calculated target speeds to bring in a corresponding amount of fresh air, the technology described herein may allow for balanced ventilation that reduces over/under pressurization and/or reduces air leaking in to the building from undesirable or low-quality sources.

Figure 1:
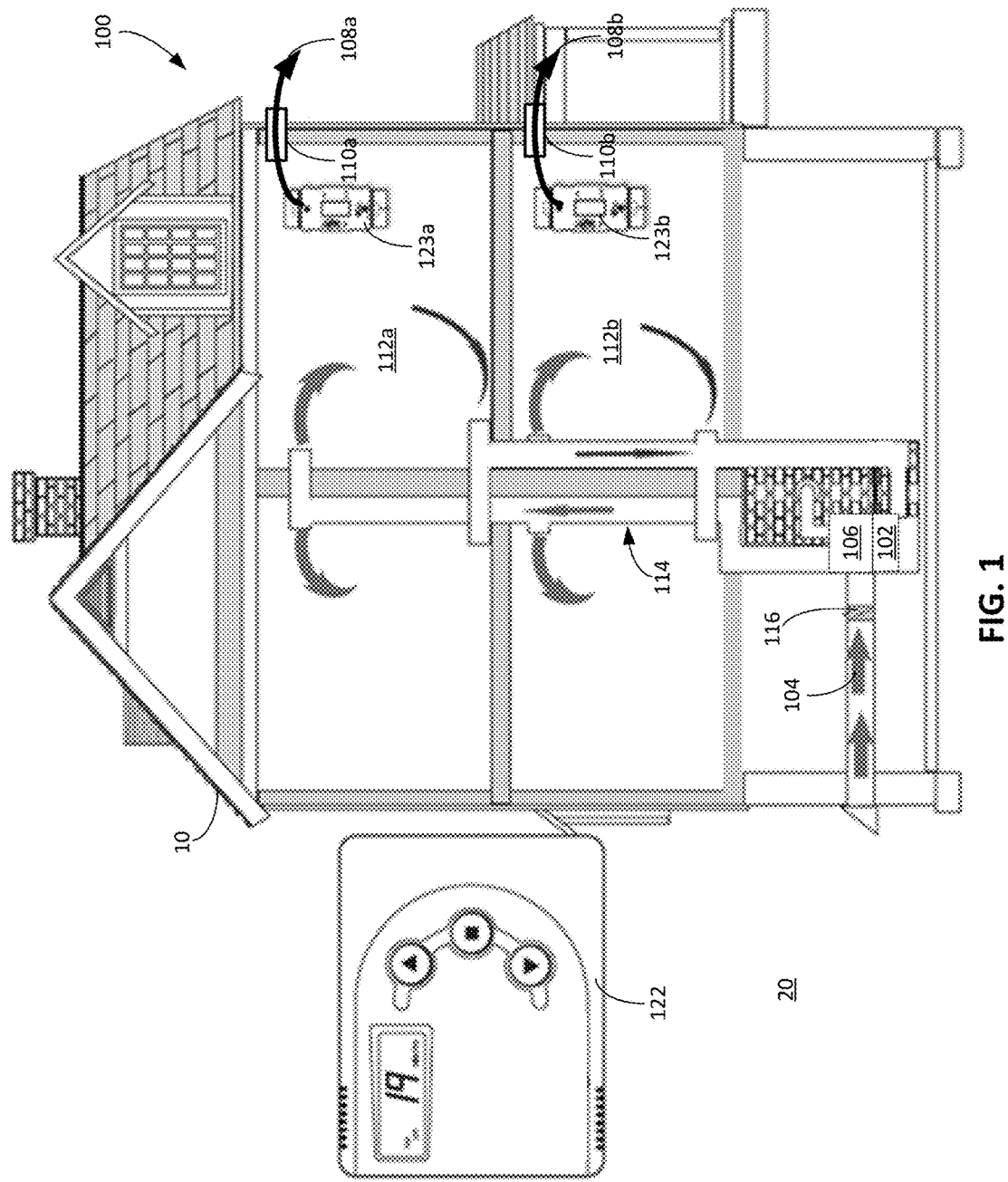
FIG. 1 is a plan view of a building with a ventilation system.

Referring to FIG. 1, a ventilation system 100 includes a controller 102 that ventilates a building 10 by controlling an inflow 104 of air drawn from an environment 20 into the building 10 based on a total outflow, e.g., outflows 108a and 108b (108 in general), of air expelled from the building 10 into the environment 20. The controller 102 operates an intake fan 106 to control a rate of the inflow 104 of air into the building 10. By monitoring a rate of the total outflow 108 of air expelled from the building, the controller 102 can select a target fan speed for the intake fan 106 such that the rate of the inflow 104 drawn by the intake fan 106 is substantially equal to the rate of the total outflow 108. In some implementations, controlling the rate of the inflow 104 in this manner may enable the controller 102 to regulate the location from where air is drawn into the building 10 such that the inflow 104 of air tends to be drawn from sources of fresh air.

The total outflow of air expelled from the building 10 can include outflows 108a, 108b generated by exhaust fans 110a, 110b, respectively, when they are activated. The exhaust fans 110a, 110b, in some cases, are single speed fans that, when activated, rotate at a single fixed speed. The exhaust fans 110a, 110b are alternatively multi-speed fans that can have a fan speed selected from a range of available fan speeds. The exhaust fans 110a and 110b may be controlled using corresponding fan control units 123a and 123b (123 in general), respectively.

The exhaust fans 110a, 110b can be positioned within different rooms of the building 10 so that occupants of the building 10 can selectively cause stale air to be expelled from the building 10 in a user-specified room. For example, in FIG. 1, the exhaust fan 110a can be positioned within a bathroom, while the exhaust fan 110b can correspond to an exhaust fan for a stove in a kitchen. In the example of FIG. 1, the exhaust fans 110a, 110b are positioned within rooms 112a, 112b, respectively, within the building 10 and, when activated, enable air to be expelled from their respective rooms 112a, 112b. The outflows 108a, 108b can be directed from the rooms 112a, 112b into the environment 20, thereby removing air from the building 10. The building 10 can include other devices that expel air from the building 10, for example, kitchen range hood fans, clothes dryers, fireplaces, and wood stoves.

When the exhaust fans 110a, 110b expel stale air from the rooms 112a, 112b, and thus remove air from the building 10, an inflow of air into the building 10 can replace the expelled air, for example, to maintain a balanced ventilation. To control the source of the air replacing the expelled air, the controller 102 controls the intake fan 106, thereby causing a total inflow of air to be drawn into the building 10 to replace the expelled air. If the amount of air brought in to the building by the intake fan is substantially or approximately equal to the amount of air expelled from the building, a balanced ventilation may be maintained, and the resulting pressure equilibrium may substantially reduce additional air to be leaked into the building from undesirable sources such as an attached garage. In some implementations, an air filter may be placed in the pathway of the inflow 104 such that the air coming into the building is filtered to improve the quality of indoor air. In some implementations, one or more operations of the controller 102 may be controlled via a manually operable control unit 122 disposed, for example, at a user-accessible location in the building.

The intake fan 106 is positioned to draw air from the environment 20 into the building 10. As shown in the example of FIG. 1, the intake fan 106 can be a central fan for the building 10 connected to an air duct system 114 that redirects the inflow 104 of air into the various rooms within the building 10. In some implementations, the system 100 can also include multiple intake fans (e.g., separate intake fans for different floors, areas, rooms etc. of a building). The air duct system 114 can thus enable the intake fan 106 to move air into each of the rooms. When the exhaust fans 110a, 110b expel air, the intake fan 106 can be activated to draw air into the building 10, and the air duct system 114 can then redirect the air drawn in by the intake fan 106 to the appropriate room. In particular, the air duct system 114 can redirect the air to replace the air expelled by the exhaust fans 110a, 110b from each of the rooms 112a, 112b.

In addition to being controlled according to the processes and methods described herein to replace air expelled by the exhaust fans 110a, 110b, the intake fan 106 can also be controlled to provide heated air or cooled air for the building 10 as desired by the occupants. The intake fan 106 can therefore be operable with heating and cooling cycles for the building 10. The intake fan 106 can be operable with a forced air heating system that heats air drawn in by the intake fan 106 and/or an air conditioner that can adjust the moisture content of the air drawn in by the intake fan 106. In some cases, the intake fan 106 can be attached to a forced air furnace. The forced air furnace can include a heating element that heats the air drawn in by the intake fan 106 to generate the heated air circulated through the building 10. The intake fan 106 can be a furnace fan that is not connected to the air duct system 114.

In some implementations, the total inflow of air can further be controlled by opening and closing a damper 116. The damper 116 can be coupled (e.g., via an electrical, mechanical or pneumatic communication) with the intake fan 106 such that the operations of the damper 116 and the intake fan 106 are coordinated. The controller 102 can transmit control signals to the damper 116 to open or close the damper 116. The controller 102 can, for example, open the damper 116 when the intake fan 106 is operating and close the damper 116 when the intake fan 106 is not operating. In addition to enabling the intake fan 106 to draw air from the environment 20 into the building 10 when open, the damper 116, when closed, can reduce passive air flow from the environment 20 into the building 10 through the air duct system 114

Figure 2:
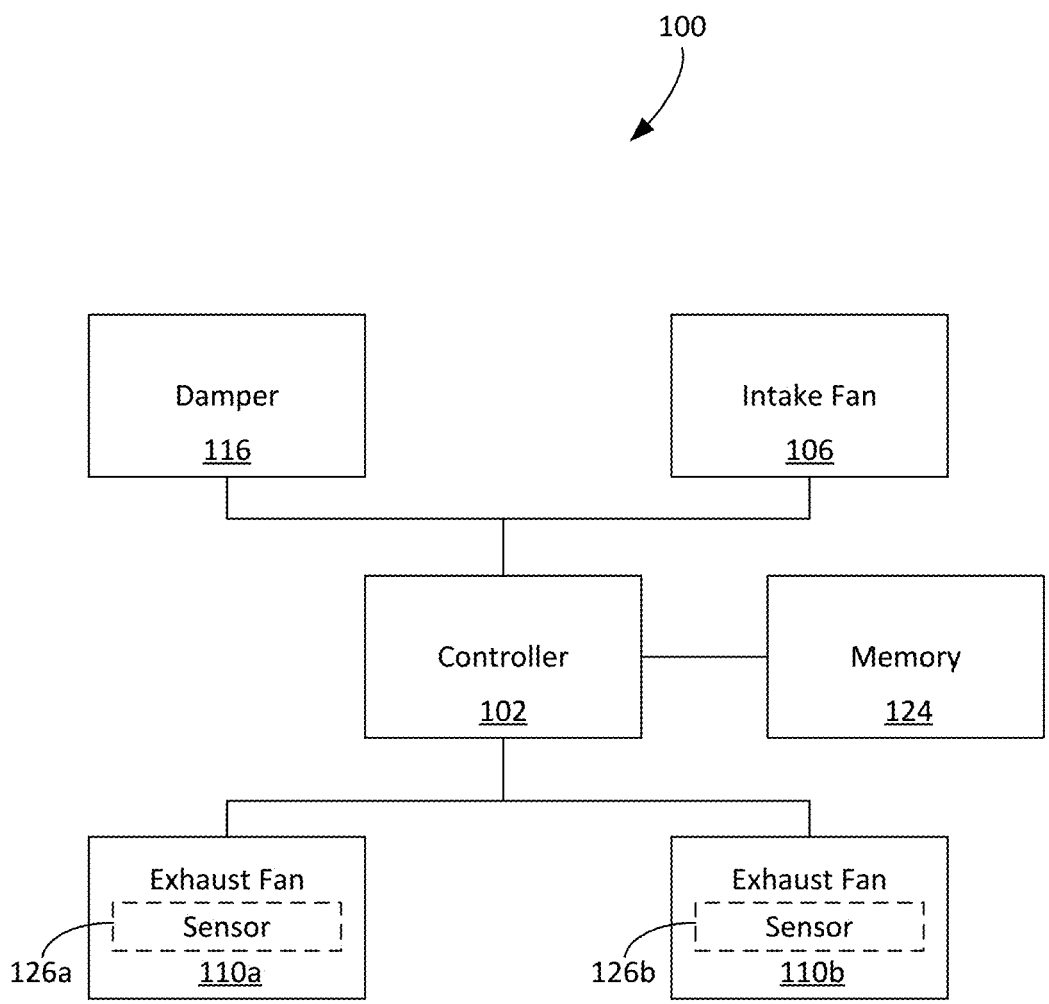
FIG. 2 is a block diagram of an example ventilation system in accordance with technology described herein.

FIG. 2 depicts a block diagram of an example of the ventilation system 100. The ventilation system 100 includes the controller 102, which can be configured to control a fan speed of one or more intake fans 106. In the example of FIG. 2, the block diagram depicts the controller 102 as being capable of communicating with one intake fan 106, the exhaust fans 110a, 110b, and/or the damper 116. The controller 102 can include one or more processing devices and memory 124. In some cases, this communication can occur through direct wired electrical connections, while in other cases, the controller 102 can communicate with one or more of elements through wireless communication. In some implementations, the controller 102 automatically controls fan speeds for one or more of the exhaust fans 110a, 110b. In some implementations, the controller 102 also controls the damper 116.

Figure 3A:
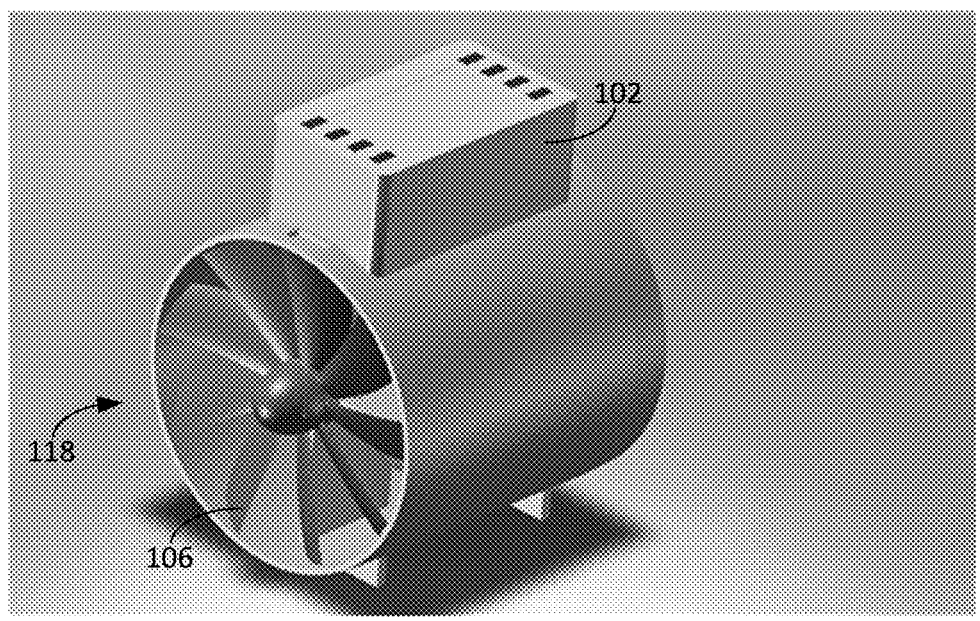
FIG. 3A is a front perspective view of an example of an intake fan unit.
Figure 3B:
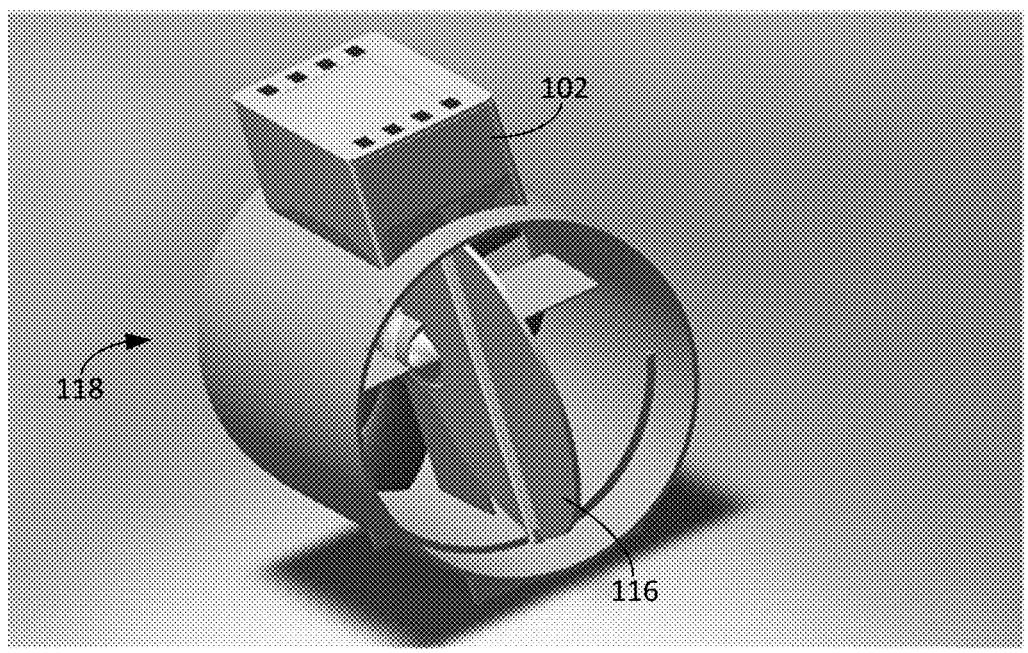
FIG. 3B is a rear perspective view of the intake fan unit of FIG. 3A.

In some implementations, as shown in FIGS. 3A and 3B, an intake fan unit 118 includes the controller 102 and the intake fan 106. The intake fan 106 can be directly connected to the controller 102 so that the controller 102 can control the fan speed of the intake fan 106. The intake fan unit 118 can be installed into the ventilation system of the building 10 such that the intake fan 106 functions as the central fan that circulates air within the building 10. The intake fan unit 118 can additionally include the damper 116. In some implementations, the ventilation system 100 includes a manually operable control unit 122 (shown in FIG. 1) configured to receive user-inputs, for example, to activate or deactivate the intake fan 106. In some implementations, the control unit 122 can be integrated with a thermostat used to control heating and cooling cycles of the building 10.

In some implementations, the exhaust fans 110 are independently operable, for example, via the corresponding fan control units 123. In some examples, the exhaust fans 110 are manually operable. In other examples, the exhaust fans are automatically controlled, for example, by the controller 102, or in accordance with operations of another equipment or device. For example, a bathroom fan may be switched on automatically when a light in the bathroom is switched on. In some implementations, the fan control units 123 are switches that can be used to activate or deactivate a corresponding exhaust fan 110. In some cases, the fan control units 123 include a regulator that can be used to control a fan speed of the exhaust fans 110.

Figure 4:
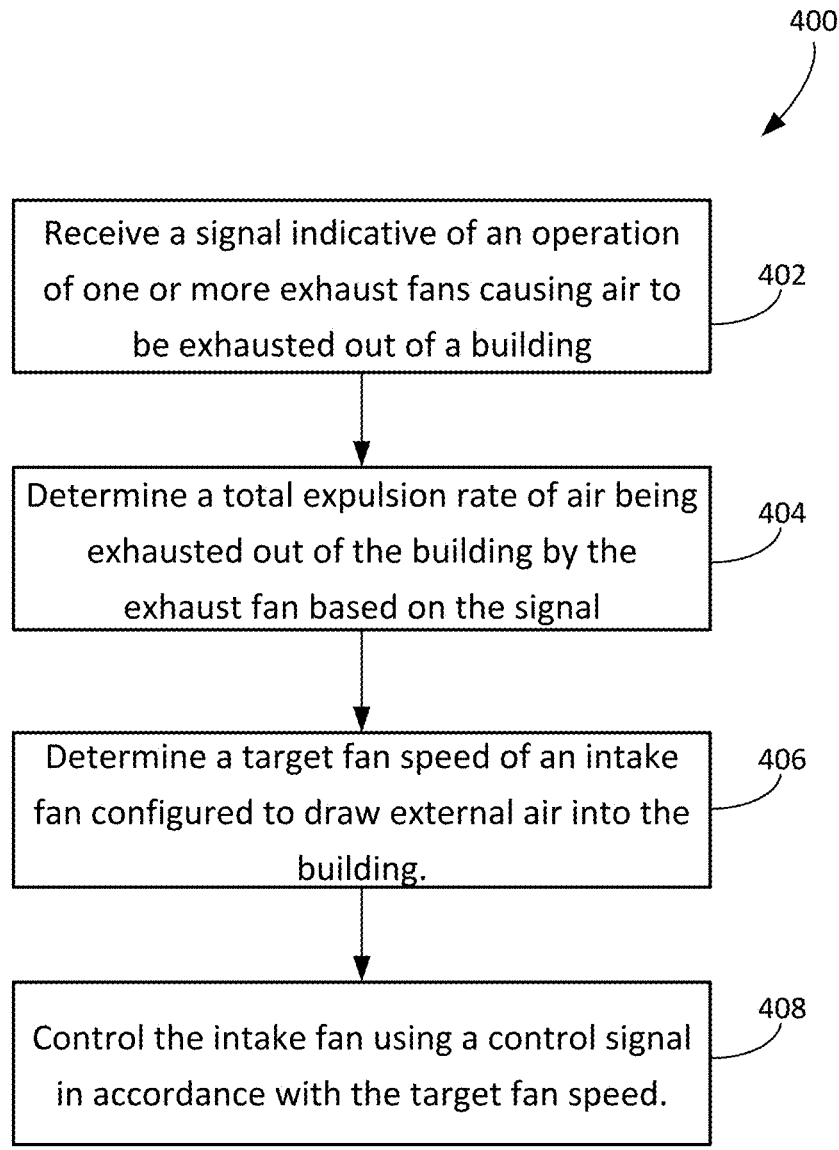
FIG. 4 is a flow chart of an example ventilation process in accordance with technology described herein.

FIG. 4 depicts a flow chart of an example process 400 for controlling the intake fan 106 to draw air into the building 10 in accordance with an amount of air expelled from the building. In some implementations, at least a portion of the process is executed by one or more processing devices of the controller 102. By executing the process 400, the controller 102 can draw in calculated amounts of fresh air from a known source to replace the expelled air. For example, the controller 102 can control the intake fan 106 to draw fresh air from the environment 20 to serve as the replacement air for the air expelled from the building 10. In this regard, the selective activation of the intake fan 106 to draw in a calculated target amount of air may promote inflow of fresh air from the environment 20 as replacement air for the expelled air, rather than from a source having less desirable air quality, such as from a garage attached to the building 10.

Operations of the process include receiving a signal indicative of an operation of one or more exhaust fans causing air to be exhausted out of the building (402). These operations can include, for example, receiving a signal from one exhaust fan, or multiple signals indicative of operations of multiple exhaust fans (e.g., the exhaust fans 110a, 110b).

Operations of the process 400 also include determining a total expulsion rate of air being exhausted out of the building by the one or more exhaust fans based on the received signals (404). For example, one or more processing devices of the controller 102 can be used to determine the total expulsion rate based on information about individual expulsion rates for each of the exhaust fans that are in operation at a given time.

In some implementations, the received signal can indicate that one or more exhaust fans have been activated or deactivated, for example, via a binary signal indicating whether a corresponding exhaust fan is on or off. In some implementations, if the received signal indicates that an exhaust fan is on, an expulsion rate for the corresponding fan can be retrieved, for example, from a memory (e.g., memory 124, as shown in FIG. 3) accessible to the controller. The total expulsion rate can be calculated as a sum of the individual expulsion rates of the exhaust fans that are indicated by the received signals to be operational. If the received signal indicates that an exhaust fan has been switched off, the total expulsion rate can be adjusted by considering the expulsion rate of the corresponding exhaust fan to be zero.

In some implementations, the received signal can indicate a level of an operational parameter of an exhaust fan. For example, the received signal can indicate one or more of a fan speed, a power delivered to the exhaust fan, a current delivered to the exhaust fan, or other operational parameters of the exhaust fan. Individual expulsion rates of the exhaust fans may then be determined based on the information about the one or more operational parameters. For example, if the received signal is indicative of a current delivered to an exhaust fan and a rotational speed of the exhaust fan, a corresponding individual expulsion rate caused by activation of the exhaust fan can be determined from the parameters.

In some cases, information regarding parameters of the one or more exhaust fans may be stored in a memory accessible to a controller, to be used in determining the total expulsion rate of air. In such cases, an individual expulsion rate of an exhaust fan may be determined, for example, based on the received signal indicative of the operation of the exhaust fan, and the stored information indicative of relevant physical or operational parameters of the exhaust fan. These parameters can include physical parameters associated with the exhaust fan, including, for example, a cross-sectional area of an air duct through which the air is exhausted by the exhaust fan, and/or information on fan dimensions. In one example, a fan speed of the exhaust fan and the corresponding cross-sectional area of the air duct associated with the exhaust fan can be used to determine the individual expulsion rate of the exhaust fan. In another example, information about fan dimensions and the associated air flow at various fan speeds can be used to determine the individual expulsion rate of the corresponding exhaust fan.

The signals indicative of the operations of the exhaust fans can be received from various sources. In some implementations, the received signal is generated by a fan control unit 123 associated with an exhaust fan. For example, once a user activates the fan control unit 123, the fan control unit can generate a signal indicating that the corresponding exhaust fan has been switched on. If the corresponding exhaust fan is a single speed fan, the corresponding fan speed can be obtained from a storage location such as the memory 124.

Referring back to FIG. 2, in some implementations, the signals indicative of the operation of exhaust fans 110a, 110b, etc., can be received from corresponding sensors 126a, 126b (126 in general), etc., respectively. In some implementations, a sensor 126 can be disposed in association with a corresponding exhaust fan 110 such that the sensor 126 detects one or more operational parameters associated with the exhaust fan 110, and accordingly transmits a signal to the controller 102. The sensor 126 can include, for example, one or more of a current sensor, a power sensor, a voltage sensor, or another appropriate sensor configured to detect an operation of the corresponding exhaust fan.

In some implementations, rather than directly detecting an operational parameter of the exhaust fan 110, the sensor 126 can be configured to detect an air flow characteristic associated with the exhaust fan 110, and accordingly transmit a signal to the controller 102. In such cases, the sensor 126 can include a flow sensor positioned within an air flow path of the exhaust fan 110a. Such a sensor can be configured to generate, for example, a signal indicative of an air flow rate caused by activation of the exhaust fan 110. In some implementations, the total expulsion rate can be determined, for example, as a sum of air flow rates detected by multiple sensors 126 disposed in association with multiple corresponding exhaust fans.

In some implementations, a user interface can allow a user to input information pertaining to physical or operational parameters of one or more exhaust fans. Such an interface can be provided, for example, on the control unit 122 described above with reference to FIG. 1. In some implementations, the user interface can also be provided via an application executing on a computing device such as a mobile device. In such cases, the information received by the user interface can be provided to a corresponding controller through a network such as the Internet. The information can also be provided to a corresponding controller through local connections such as Bluetooth® or Wi-Fi connections. The information received by the user-interface can be used by the controller 102, for example, to determine the individual expulsion rates of the exhaust fans. In one example, the user interface can be used to receive make/model information of an exhaust fan 110, which can then be used to connect to a data repository (e.g., a database of fan models) to retrieve one or more parameters relevant to calculating the individual expulsion rate of the exhaust fan 110. In some cases, the user interface can be used to input one or more relevant operational or physical parameters associated with an exhaust fan and/or other structural/functional elements of the ventilation system.

Operations of the process 400 further includes determining a target fan speed for an intake fan (e.g., the intake fan 106) that draws external air into the building (406), e.g., from the environment 20 into the building 10. The target fan speed can be determined such that the intake fan 106, when operated at the target fan speed, achieves a target inflow rate into the building that is substantially equal to the total expulsion rate of the one or more exhaust fans 110.

The target fan speed can be determined in various ways. In some implementations, one or more parameters of the intake fan 106 can be used in conjunction with the determined total expulsion rate to select the target fan speed for the intake fan 106. The parameters can include, for example, physical parameters associated with the intake fan 106, such as a cross-sectional area of an air duct associated with the intake fan 106. The parameters can include inflow rates for given fan speed settings for the intake fan 106, for example, as stored in a lookup table. In such cases, a controller 102 may determine the target fan speed by retrieving, from the lookup table, the fan speed for a target inflow rate that is substantially equal to the total expulsion rate.

If the controller 102 is a standalone component separate from the intake fan 106, the memory 124 can store transfer functions between the target fan speed and the inflow rate for different models of intake fans. When the controller 102 is connected to the intake fan 106, the controller 102 can determine the model of the intake fan 106 and then thereby determine the transfer function to be applied to determine the target fan speed. The controller 102 can determine the model of the intake fan 106 based on a user input or an identity stored in a memory for the intake fan 106. The controller 102 then determines the target fan speed by applying the transfer function by setting the determined total expulsion rate equal to the inflow rate. Alternatively, the controller 102 uses a lookup table associating the fan speed and the inflow rate that is specific to the model of the intake fan 106.

Operations of the process also includes controlling the intake fan in accordance with the determined target fan speed (408). For example, the controller 102 can be configured to control the intake fan 106 using a control signal generated in accordance with the target fan speed. The controller 102 can generate the control signal based on the determined target fan speed and then transmit the control signal to the intake fan 106 to cause the intake fan 106 to run at the target fan speed. While running at the target fan speed, the intake fan 106 can draw air from the environment 20 into the building 10 at a sufficient rate to replace the air expelled by the exhaust fan 110a.

In some implementations, the controller 102 can detect a location of the exhaust fan 110 and control the ventilation system 100 appropriately to redirect air drawn in by the intake fan 106 toward the room where the exhaust fan 110 is located. For example, the air duct system 114 can include dampers or controllable vents that the controller 102 can selectively open and close to redirect the air toward the exhaust fan 110. When the exhaust fan 110a is activated, the controller 102 can determine the room 112a in which the exhaust fan 110a is located. The controller 102 can then open the damper controlling air flow into that room 112a and close the dampers for air flow into other rooms, e.g., the room 112b. In some cases, the other dampers or vents can be controlled such that they remain partially open, while the damper associated with the exhaust fan 110a is open to a greater extent. An inflow of air can thus continue to be circulated through each of the rooms even as a greater amount of air is directed to the room with the exhaust fan 110a activated.

The intake fan 106, as described herein, can be part of a central ventilation system. The intake fan 106 can alternatively or additionally be connected to a forced air furnace so that the intake fan 106 can control circulation of heated air through the building 10. In such configurations, even when none of the exhaust fans 110b in the building 10 have been activated, the intake fan 106 may be activated to provide for circulation of air in the building 10. When the intake fan 106 is already active (e.g., because of one exhaust fan being active), the controller 102 can control the intake fan 106 to increase its fan speed upon detecting activation of one or more additional exhaust fans 110. In some examples, instead of increasing the target fan speed, the controller 102 can partially close dampers for other rooms of the building 10 so that a greater amount of air is directed into the one or more rooms 112 corresponding to the one or more additional exhaust fans 110. In some implementations, the controller 102 further opens the dampers associated with the one or more rooms 112 corresponding to the one or more additional exhaust fans 110. In some examples, the controller 102 can perform a combination of the above operations. The controller 102 can partially close certain dampers and further open the damper for the rooms associated with the one or more exhaust fans 110 while also controlling the intake fan 106. The controller 102 can determine the appropriate operations for the intake fan 106 and the dampers to replace the air expelled from the room by the one or more additional exhaust fans 110 while maintaining an amount of air circulation in other rooms in the building 10.

In cases where the building 10 may have ventilation requirements specific to the building codes of the building's locality, the controller 102 can operate the intake fan 106 to ensure that the circulation rate of air is maintained above the minimum requirement. Upon receiving signals indicative of operations of the exhaust fans 110, the controller 102 can operate the intake fan 106 to achieve the target inflow rate without decreasing the circulation rate of air below the minimum requirement specified in the building codes. Furthermore, if the building codes require a certain duration of time that the intake fan 106 is operated, the operation of the intake fan 106 to replace air expelled by exhaust fans can count towards this requirement.

If the received signal indicates that an exhaust fan 110 has been deactivated, the controller 102 can accordingly control the intake fan 106 using the control signal to reduce the inflow rate of air. The controller 102 additionally can generate a control signal to control the damper 116 to positively shut off the air flow into the building 10 through the ventilation system 100. For example, if the intake fan 106 has not been set to circulate air and other exhaust fans in the building 10 are not activated, upon detecting that the exhaust fan 110 has been deactivated, the controller 102 can deactivate the intake fan 106 and close the damper 116.

In some implementations, in addition to monitoring operations of the exhaust fans 110, the controller 102 can operate the exhaust fans 110 to control the total expulsion rate of air from the building 10. In some cases, the controller 102 can be operated to control each of the exhausts fans 110 and the intake fan 106 in a ventilation mode. For example, it may be desirable to rapidly exhaust air in the building 10 and replace the air with fresh air from the environment 20. A user can toggle such an exhaust mode such that each of the exhaust fans 110 are activated to expel air from the building 10. The intake fan 106 can also be activated to replace the air at an equal rate.

Figure 5:
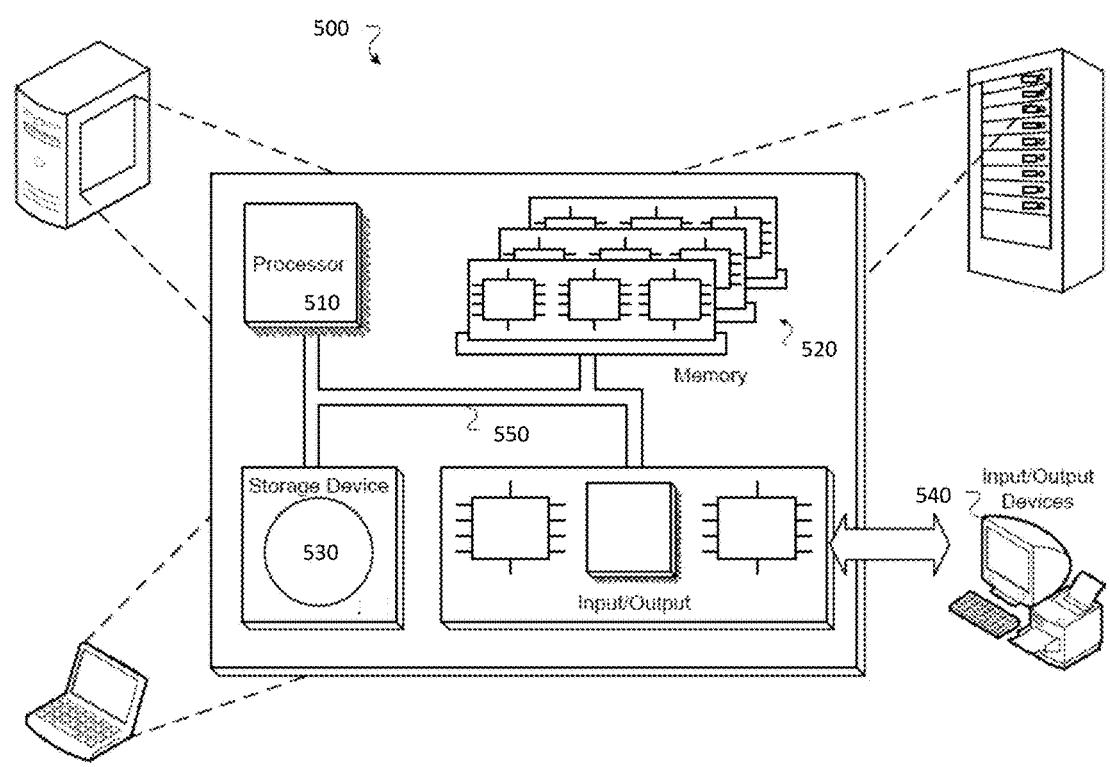
FIG. 5 is a schematic diagram of a computing system.

The controller 102 and any associated components, e.g., the memory 124 and the control unit 122, can be part of a computing system that facilitates control of the ventilation system 100 according to processes and methods described herein. FIG. 5 is a schematic diagram of an example of a computer system 500 that can be used to implement the controller 102 described in association with any of the computer-implemented methods described herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some examples, the processor 510 is a single-threaded processor, while in some cases, the processor 510 is a multi-threaded processor. The processor 510 is capable of processing instructions stored in the memory 520 or on the storage device 530 to display graphical information for a user interface on the input/output device 540. In some implementations, the processor 510 can be substantially similar to the controller 102 described above with reference to FIGS. 1 and 2.

Memory storage for the system 500 can include the memory 520 as well as the storage device 530. The memory 124 described with respect to FIG. 2 can correspond to one or both of the memory 520 and the storage device 530 of FIG. 5. The memory 520 stores information within the system 500. The information can be used by the processor 510 in performing processes and methods described herein. In some examples, the memory 520 is a computer-readable storage medium. The memory 520 can include volatile memory and/or non-volatile memory. The storage device 530 is capable of providing mass storage for the system 500. In general, the storage device 530 can include any non-transitory tangible media configured to store computer readable instructions. Optionally, the storage device 530 is a computer-readable medium. Alternatively, the storage device 530 may be a floppy disk device, a hard disk device, an optical disk device, or a tape device.

The system 500 includes the input/output device 540, which can correspond to one or more of the control unit 122 or the fan control units 123a, 123b. The input/output device 540 provides input/output operations for the system 500. In some examples, the input/output device 540 includes a keyboard and/or pointing device. In some cases, the input/output device 540 includes a display unit for displaying graphical user interfaces. Thus, for example, while depicted as wall switches in FIG. 1, the fan control units 123a, 123b can correspond to a desktop computer, a mobile phone, a mobile computing device, or other appropriate input/output device enabling the operator to control the fan speed of the exhaust fans 110a, 110b.

The features of the methods and systems described in this application can be implemented in digital electronic circuitry, or in computer hardware, firmware, or in combinations of them. The features can be implemented in a computer program product tangibly stored in an information carrier. The information carrier can be, for example, a machine-readable storage device, for execution by a programmable processor. Operations can be performed by a programmable processor executing a program of instructions to perform the functions described herein by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages. The computer program can be deployed in any form, including as a stand-alone program or as a module, component, subroutine, or other unit suitable for use in a computing environment.

Generally, a computer will also include, or be operatively coupled to communicate with, one or more mass storage devices for storing data files. Such devices can include magnetic disks, such as internal hard disks and removable disks, magneto-optical disks, and optical disks. Storage devices suitable for storing the computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Alternatively, the computer can have no keyboard, mouse, or monitor attached and can be controlled remotely by another computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

The processor 510 carries out instructions related to a computer program. The processor 510 can include hardware such as logic gates, adders, multipliers and counters. The processor 510 can further include a separate arithmetic logic unit (ALU) that performs arithmetic and logical operations.

Other implementations may be within the scope of this disclosure. For example, in certain implementations, the controller 102 can be operable with a sensor that detects environmental conditions of the environment 20 outside of the building 10 and determine that the air quality of the environment 20 is not presently desirable. The controller 102 can inhibit operations of the exhaust fans 110 or the intake fan 106 when the air quality is not desirable. In addition, the sensor can be used to detect a combination of air conditions in the environment 20 that would cause a greater amount of natural ventilation through leaks in the building envelope from the environment 20. The sensor can detect, for example, humidity and temperature of the environment 20 that would be conducive to natural inflow of fresh air from the environment 20. When the natural ventilation is high, the controller 102 can reduce the inflow of air generated by the intake fan 106 to account for this natural ventilation, thereby reducing the amount of energy expended by the intake fan 106.

In some cases, the controller 102 can allow the exhaust fans 110 to run and can delay operation of the intake fan 106 in response to the activation of the exhaust fans 110. The controller 102 can track the amount of time that the exhaust fans 110 have been running and then activate the intake fan 106 upon detecting that the air quality in the environment 20 has improved. For example, if the exhaust fans 110 are activated during daytime when outside temperatures are high, the controller 102 can delay activation of the intake fan 106 until cooler evening or nighttime periods to bring in replacement air.

While two exhaust fans 110a, 110b are shown and described with respect to FIG. 1, in some implementations, one, three, or more exhaust fans are positioned within the building to move air from within the building to outside of the building. Similarly, the building 10 may include two or more intake fans that can be activated in parallel. For larger building or multi-level buildings, the intake fans can be positioned in different areas of the building such that air can be more quickly drawn into the different areas. In some cases, each exhaust fan can include a corresponding intake fan in the room with the exhaust fan. The controller 102 can activate the corresponding intake fan when an exhaust fan in a particular room is activated.

In some implementations, the intake fan 106 or the intake fan unit 118 could include a filter to filter incoming fresh air. As the filter becomes clogged or restricted with debris, the controller 102 can, for example, communicate an indication that the filter needs to be cleaned or replaced. The indication can be transmitted to an alarm panel or an indicator light in the building to notify occupants of the building of the condition of the filter. In some examples, the controller 102 can wirelessly communicate with a server such that the condition of the filter can sent to a user's mobile device. In some cases, the controller 102 can automatically send the indication to a server to purchase a replacement filter to be shipped to the building.

In some examples, the controller 102 can be operable with sensors that detect when passive ventilation devices, such as windows or doors, are allowing natural ventilation to infiltrate into the building 10. The controller 102 can reduce the amount of air flow generated by the intake fan 106 in response to detecting activation of the exhaust fans 110 so as to account for the additional circulation facilitated by the passive ventilation devices.

A number of implementations have been described. Nevertheless, it will be understood that various modifications may be made. Accordingly, other implementations are within the scope of the claims.

What is claimed is:

1. A method of ventilation, the method comprising:
receiving at least one signal indicative of an operation of one or more exhaust fans causing air to be exhausted out of a building;
determining, by one or more processing devices, a total expulsion rate of air being exhausted out of the building by the one or more exhaust fans based on the at least one signal;
determining, by the one or more processing devices, a target fan speed of one or more intake fans configured to draw external air into the building, wherein the target fan speed of the one or more intake fans is determined to achieve an inflow rate that is substantially equal to the total expulsion rate; and
controlling the one or more intake fans using one or more control signals in accordance with the target fan speed.

2. The method of claim 1, wherein the one or more exhaust fans comprise a plurality of exhaust fans.

3. The method of claim 1, wherein receiving the at least one signal indicative of the operation of the one or more exhaust fans comprises receiving flow rate data from a sensor coupled to each of the one or more exhaust fans, the at least one signal being indicative of the flow rate data.

4. The method of claim 1, wherein determining the total expulsion rate of air comprises determining a flow rate of each of the one or more exhaust fans based on a fan speed of each of the one or more exhaust fans.

5. The method of claim 1, wherein controlling the one or more intake fans comprises operating an intake fan of a forced air furnace.

6. The method of claim 1, further comprising:
detecting deactivation of each of the one or more exhaust fans; and
deactivating the one or more intake fans in response to detecting the deactivation of each of the one or more exhaust fans.

7. The method of claim 6, further comprising closing a motorized damper in response to detecting the deactivation of each of the one or more exhaust fans.

8. The method of claim 1, further comprising initiating the operation of the one or more exhaust fans to control the total expulsion rate of air being exhausted out of the building.

9. The method of claim 1, further comprising selectively directing the external air drawn by the one or more intake fans toward a location of the one or more exhaust fans in the building.

10. A system for ventilation, the system comprising:
a controller comprising:
memory, and
one or more processors operable to execute instructions stored on a computer readable storage device to perform operations comprising:
receiving at least one signal indicative of an operation of one or more exhaust fans causing air to be exhausted out of a building,
determining, based on the at least one signal, a total expulsion rate of air being exhausted out of the building by the one or more exhaust fans,
determining, a target fan speed of one or more intake fans configured to draw external air into the building, wherein the target fan speed of the one or more intake fans is determined to achieve an inflow rate that is substantially equal to the total expulsion rate, and
controlling the one or more intake fans using one or more control signals in accordance with the target fan speed.

11. The system of claim 10, wherein the one or more exhaust fans comprise a plurality of exhaust fans.

12. The system of claim 10, wherein receiving the at least one signal indicative of the operation of the one or more exhaust fans comprises receiving flow rate data from a sensor coupled to each of the one or more exhaust fans, the at least one signal being indicative of the flow rate data.

13. The system of claim 10, wherein determining the total expulsion rate of air comprises determining a flow rate of each of the one or more exhaust fans based on a fan speed of each of the one or more exhaust fans.

14. The system of claim 10, wherein controlling the one or more intake fans comprises operating an intake fan of a forced air furnace.

15. The system of claim 10, wherein the operations further comprise:
detecting deactivation of each of the one or more exhaust fans; and
deactivating the one or more intake fans in response to detecting the deactivation of each of the one or more exhaust fans.

16. The system of claim 15, wherein the operations further comprise closing a motorized damper in response to detecting the deactivation of each of the one or more exhaust fans.

17. The system of claim 10, wherein the operations further comprise initiating the operation of the one or more exhaust fans to control the total expulsion rate of air being exhausted out of the building.

18. The system of claim 10, further comprising the one or more intake fans.

19. The system of claim 10, wherein the operations further comprise selectively directing the external air drawn by the one or more intake fans toward a location of the one or more exhaust fans in the building.

20. A ventilation system comprising:
one or more an intake fans configured to supply external air into a building; and
a controller operatively coupled to the one or more intake fans, the controller configured to:
receive at least one signal indicative of an operation of one or more exhaust fans causing air to be exhausted out of a building,
determine, based on the at least one signal, a total expulsion rate of air being exhausted out of the building by the one or more exhaust fans,
determine a target fan speed of one or more intake fans configured to draw external air into the building, wherein the target fan speed is determined to achieve an inflow rate that is substantially equal to the total expulsion rate, and
control the one or more intake fans using a control signal in accordance with the target fan speed.

21. The ventilation system of claim 20, further comprising the one or more exhaust fans.

22. The ventilation system of claim 20, further comprising one or more sensors, each of which is operatively coupled with the one or more exhaust fans, wherein the one more sensors are configured to generate the at least one signal indicative of an operation of one or more exhaust fans.

23. The ventilation system of claim 20, wherein the one or more exhaust fans comprise at least one bathroom exhaust fan and at least one kitchen-hood fan.

24. The ventilation system of claim 20, further comprising a motorized damper configured to be opened and closed in accordance with control signals generated by the controller.

25. The ventilation system of claim 20, wherein the controller is configured to selectively direct the external air drawn by the one or more intake fans toward a room in the building where the one or more exhaust fans are located.

* * * * *